United States Patent
David

(10) Patent No.: US 7,345,680 B2
(45) Date of Patent: Mar. 18, 2008

(54) LAMINATED TOUCH SCREEN

(76) Inventor: Albert M. David, 1512 Kingsdale Avenue, Ottawa, Ontario (CA) K1T 1H2

(*) Notice: Subject to any disclaimer, the term of this patent is extended or adjusted under 35 U.S.C. 154(b) by 197 days.

(21) Appl. No.: 10/603,518

(22) Filed: Jun. 25, 2003

(65) Prior Publication Data

US 2004/0004605 A1    Jan. 8, 2004

(30) Foreign Application Priority Data

Jun. 25, 2002    (CA) ................................. 2391745

(51) Int. Cl.
*G06F 3/045*    (2006.01)
(52) U.S. Cl. ..................... 345/174; 178/18.01
(58) Field of Classification Search .. 178/18.01–18.11; 345/173, 174
See application file for complete search history.

(56) References Cited

U.S. PATENT DOCUMENTS

| | | |
|---|---|---|
| 3,574,030 A | 4/1971 | Collander |
| 4,220,815 A | 9/1980 | Gibson |
| 5,159,323 A | 10/1992 | Mase |
| 5,445,890 A | 8/1995 | Bayha et al. |
| 5,838,309 A * | 11/1998 | Robsky et al. ............. 345/173 |
| 6,287,674 B1 * | 9/2001 | Verlinden et al. ........... 428/210 |
| 6,555,235 B1 * | 4/2003 | Aufderheide et al. ....... 428/447 |
| 6,556,189 B1 * | 4/2003 | Takahata et al. ............ 345/173 |
| 6,809,280 B2 * | 10/2004 | Divigalpitiya et al. ...... 200/512 |

FOREIGN PATENT DOCUMENTS

| | | |
|---|---|---|
| CA | 1139209 | 1/1983 |
| CA | 2359366 | 7/2000 |
| CA | 2370121 | 11/2000 |
| CA | 2038598 | 1/2002 |

* cited by examiner

*Primary Examiner*—Amr A. Awad
*Assistant Examiner*—Michael Pervan
(74) *Attorney, Agent, or Firm*—Sturm & Fix LLP

(57) ABSTRACT

In a touch screen having a flexible outer membrane with a first conducting surface, a backing surface with a second conductive surface, and sensors to detect contact between the first conducting surface and the second conducting surface, the improvement comprising the flexible outer membrane, wherein the flexible outer layer consists of an ultra-thin glass layer, a polymer layer; and an optical adhesive between the ultra-thin glass layer and the polymer layer, the optical adhesive holding the ultra-thin glass layer to the polymer layer.

35 Claims, 4 Drawing Sheets

LAMINATED TOUCH SCREEN

FIELD OF THE INVENTION

The present invention relates to touch screen technology, and more particularly to resistive touch screen technology.

BACKGROUND TO THE INVENTION

Of various interfaces available for interacting with a computer system one of the easiest to use and understand is the touch screen. This technology allows a user to simply touch an icon or picture to navigate through the system, display the information the user is seeking, and to enter data. For this reason this technology is widely used in many areas, including bank machines, information kiosks, restaurants, cars, etc.

A number of different methodologies are used to implement touch screen technology, and each has advantages and disadvantages. The three main types of technology used are resistive, capacitive and surface acoustic wave.

Resistive technology uses a flexible membrane that is affixed over a display. The membrane and display each have a conductive layer, and typically the membrane is energized with an electrical potential. When the membrane is touched, it is brought into contact with the conductive layer on the display, and this creates current flow. Various sensors around the display measure the current and a controller can determine, either through an absolute value or through a ratio with the current measured at other sensors, the location of the touch. One example of this technology is found in U.S. Pat. No. 4,220,815 to Gibson et al.

One of the advantages of resistive touch screens is that they can be pressed by either a finger or a stylus. The technology responds to pressure and the pressure can be exerted by anything. This is important in some cases where a user may wish to press the screen with the back of a pen or other stylus, with fingernails or with gloved hands.

A second advantage is that they are sealed and not affected by dirt. Thus they can for example be used in industrial applications where the user's hands may be greasy or dirty. Further, the touchscreen will work irrespective of whether there is dust or grime on the screen or in the area around the periphery of the screen.

This technology will also continue to work even when scratches exist on the outer surface of the membrane.

The main disadvantage of resistive touch screens to date has been the material from which the flexible membrane has been made. The requirement that the membrane be flexible and resistant to breakage has generally meant that polyester films have been used. The problem with these films is that they are easily scratched, torn and melted, and are thus susceptible to vandalism or inadvertent damage. This has generally limited the use of this technology to applications where access to the screens is restricted, and where the general public is not given access to these machines. For example, information kiosks in shopping malls or airports do not typically use resistive touch screens due to the vandalism potential.

A second technology for touch screens is capacitive. In this technology a layer of glass is used as a dielectric, and typically has a sensor grid on its lower surface. The touch of a user creates a change in capacitance that can be measured by the sensor grid, allowing the controller to determine when and where a touch occurs.

The advantage of capacitive touch screens is that their outer layer is glass, and thus more resistant to vandalism and damage.

One disadvantage of capacitive touch screens is that they can be susceptible to electromagnetic interference, and can thus produce false hits. This interference can be caused by a number of things, but most commonly in public locations by cellular telephones and pagers. Due to this potential interference, capacitive touch screen cannot be used in certain applications such as in some military equipment.

A second disadvantage is that the sensitivity of the screen can be affected by dirt and scratches. These change the capacitance that is sensed, and can create false touch signals.

Another disadvantage is that skin must be used to make contact with the display. A stylus, fingernail or gloved hand will not produce a sensed touch. Further, in some cases dry hands may not create a sensed touch.

A third technology that is used is the surface acoustic wave. In this technology ultra-sonic waves are emitted onto the surface of the screen, and microphones situated around the screen detect these waves. The periphery of the screen is generally reflective to the waves. When the screen is touched the waves are affected, and a controller is able to determine the location of the touch based on the information received by the microphones.

The major problem with this technology is that it is susceptible to dust and dirt. Any particle will affect the waves. Further, when these types of screens are cleaned, the dirt may be pushed to the periphery, where it will affect the reflective surface. The result of the dirt is that a touch may be perceived to be in a different location than the actual touch location.

What is therefore needed is a touchscreen technology that is robust, so that it can sense the touch of a finger, gloved hand, or any stylus. Further, the technology is required to be unaffected by dirt and scratches. Also, the outer touch surface must be hard and resistant to vandalism.

SUMMARY OF THE INVENTION

The present invention overcomes the shortcomings of the prior art by providing a glass laminate resistive touchscreen. This presents the advantage of having the robustness of resistive touchscreen technologies but overcoming the difficulties of this technology by providing a surface that is resistant to scratching, cutting and burning, and thus is more difficult to vandalize.

The laminate of the present invention includes an ultra-thin layer of glass to which a layer of polyester is adhered using an optical laminate material. The three layers are laminated to provide a uniformly transparent yet flexible surface that is resistant to cracking and virtually impossible to shatter.

One of the problems found with this laminate when used with touch screens is that the different rates of thermal expansion of the various layers can cause rumples at the periphery of the polyester layer, which can cause false touch senses. The present invention also overcomes this difficulty by providing a mounting means that includes an elastic tensioner such as silicon rubber to provide an elastic force ensuring the polyester layer is always taut.

In a broad aspect, then, the present invention relates to a flexible membrane for a resistive touch screen display, said flexible membrane comprising: a glass laminate, wherein said glass laminate consists of: an ultra-thin glass layer; a polymer layer; and an optical adhesive between said ultra-thin glass layer and said polymer layer, said optical adhesive holding said ultra-thin glass layer to said polymer layer.

In a further broad aspect, the present invention relates to a touch screen having a flexible outer membrane with a first conducting surface, a backing surface with a second conductive surface, and sensors to detect contact between the first conducting surface and the second conducting surface, the improvement comprising: the flexible outer membrane, wherein the flexible outer layer consists of an ultra-thin glass layer; a polymer layer; and an optical adhesive between said ultra-thin glass layer and said polymer layer, said optical adhesive holding said ultra-thin glass layer to said polymer layer.

In another broad aspect, the present invention relates to a resistive touch screen display, said display comprising: a flexible membrane, wherein said flexible membrane consists of: an ultra-thin glass layer; a polymer layer, said polymer layer being larger than said glass layer and said polymer layer extending beyond the periphery of said glass layer; and an optical adhesive between said ultra-thin glass layer and said polymer layer, said optical adhesive holding said ultra-thin glass layer to said polymer layer; a backing surface; a pressure sensitive adhesive affixed between the periphery of said polyester layer and said backing surface; an elastic tensioner affixed between the periphery of said polyester layer and said backing surface, said elastic tensioner being adjacent to said pressure sensitive adhesive; a first conductive layer affixed to said polyester layer; a second conductive layer affixed to said backing surface; and sensors used to detect where said first conductive layer contacts said second conductive layer.

In yet another broad aspect, the present invention relates to a process for the creation of a flexible laminate membrane for a resistive touch screen, the flexible laminate membrane having a glass layer and a polyester layer, the process comprising the steps of: applying an optical adhesive to said glass layer; affixing a polyester layer over said optical adhesive; rolling said optical polyester layer from the center of said polyester layer outwards to remove excess optical adhesive and air bubbles; and pressing said polyester layer, glass layer and optical adhesive combination in a high pressure press to ensure a uniform level of optical adhesive.

BRIEF DESCRIPTION OF THE DRAWINGS

For a more complete understanding of the nature and objects of the invention, reference should be had to the following detailed description taken in connection with the accompanying drawing in which.

DETAILED DESCRIPTION OF THE PREFERRED EMBODIMENT

As discussed above, resistive touch screen technology would be the preferred technology for numerous applications, especially those in which the public needed to use touch screens. The robustness of this technology allows it to function regardless of dirt, dust, or electromagnetic signals. The screen can be touched by a bare hand, gloved hand, or stylus and still function. However, the main problem that needs to be overcome is the vulnerability of the soft upper touchscreen layer.

It has been found by the inventor that a thin glass layer possesses enough flexibility to allow it to be used for touch screen applications. Glass useful for this purpose includes Schott Borofloat D263™ or Corning 0211™ and is generally about 0.5 mm thick although greater or lesser thicknesses are possible as long as the glass behaves like a film. Further, by having an outer glass layer, the problems of a soft polymer outer layer are overcome. Glass is much harder, and thus not susceptible to being cut or burned. It is also more resistant to scratches and general wear and thus its use increases the life of touch screens. The problem with ultra-thin glass however is that it is very brittle, and easily cracks and shatters with very minimal contact. Glass has therefore not been used previously for resistive touch screens.

Figure 1:
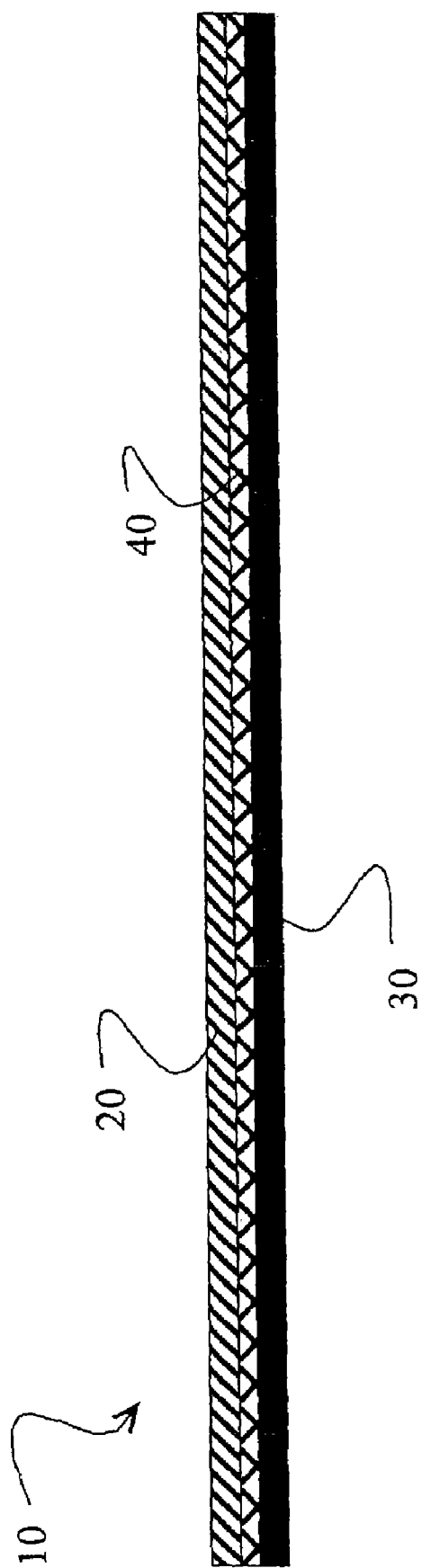
FIG. 1 shows a side elevational cross-sectional view of the glass-polyester laminate of the present invention.

Reference is now made to FIG. 1. The inventor has found that the addition of a polymer substrate layer 30 laminated to the ultra-thin glass layer 20 using an optical adhesive 40 overcomes the brittleness of the glass. The creation of this laminate 10 makes it extremely difficult to crack glass layer 20, and glass layer 20 can be bent and pressed without risk of breakage. Further, even if cracking does occur, polymer substrate 30 ensures that glass layer 20 does not shatter, and resistive touch screen laminate 10 remains intact and functional.

In a preferred embodiment, polymer layer 30 of laminate 10 is a polyester, and will be referred to hereinafter as polyester layer 30. One skilled in the art will however appreciate that other suitable polymers can be used. Polyester layer 30, in the preferred embodiment, comprises a polyester film, also referred to in the art as PET, with a thickness of approximately 0.007 inches, or 0.175 mm. Suitable films include ICI Melnex™ or Dupont Clear Mylar™. However, the use of other films is contemplated, and in one embodiment it is envisioned that polyester layer 30 may even be opaque to provide a fixed graphic for the touch screen.

In one embodiment of the invention, a conductive silver buss bar (not shown) may be used to help the transmission of current flow from polyester layer 30. Such conductive layers are well known in the art and are typically applied using a silk screen process. However, it is also contemplated that no buss bar be used in an alternative embodiment, in which polyester layer 30 is used without such a bar.

Polyester layer 30 and ultra-thin glass layer 20 are laminated together using a liquid or film optical adhesive 40. One skilled in the art will realize that optical adhesive 40 forms a thin layer between polyester layer 30 and glass layer 20, and that FIGS. 1 to 4 show an exaggerated thickness for this layer for illustrative purposes only.

Optical adhesive 40 is transparent and provides sufficient durability to hold the two layers 20 and 30 together. One suitable optical adhesive has been found to be Norland™ Optical Adhesive 61. The skilled person will however realize that other suitable adhesives may be used.

In applying adhesive 40, it is aesthetically preferable to ensure that the adhesive is applied evenly and with no bubbles or gaps, creating a laminate 10 that is uniformly planar and transparent. This lamination process involves applying a relatively thick layer of optical glue between glass layer 20 and polyester layer 30. The layer of glue must be thick enough to allow air bubbles to be squeezed out, which is much more difficult to do when thin layers of glue are applied.

In practice, layers 20 and 30 are laminated together with glue, and a roller is used to squeeze out excess glue and air bubbles. The roller is preferably applied from the centre of laminate 10 and rolls towards the edges of the laminate. A wave of glue and air bubbles is thus propelled to the edges of laminate 10, leaving a thin layer of glue with fewer or ideally no air bubble behind.

After rolling, laminate 10 is placed between a pair of ¼" (0.64 cm) thick steel plates, and the plates are actuated by a press to apply 5-10 tonnes of pressure to the laminate. More or less pressure may be applied as required. The primary purpose of the pressure is to evenly distribute the glue between glass layer 20 and polyester layer 30 to eliminate high and low spots.

During the application of pressure, an absorbent medium such as tissue is placed between the laminate and the steel plates to protect the laminate and absorb the excess glue that is squeezed out. At the end of the lamination process, the thickness of the glue is preferably limited to 0.001-0.002 inches (0.025-0.05 mm).

Figure 2:
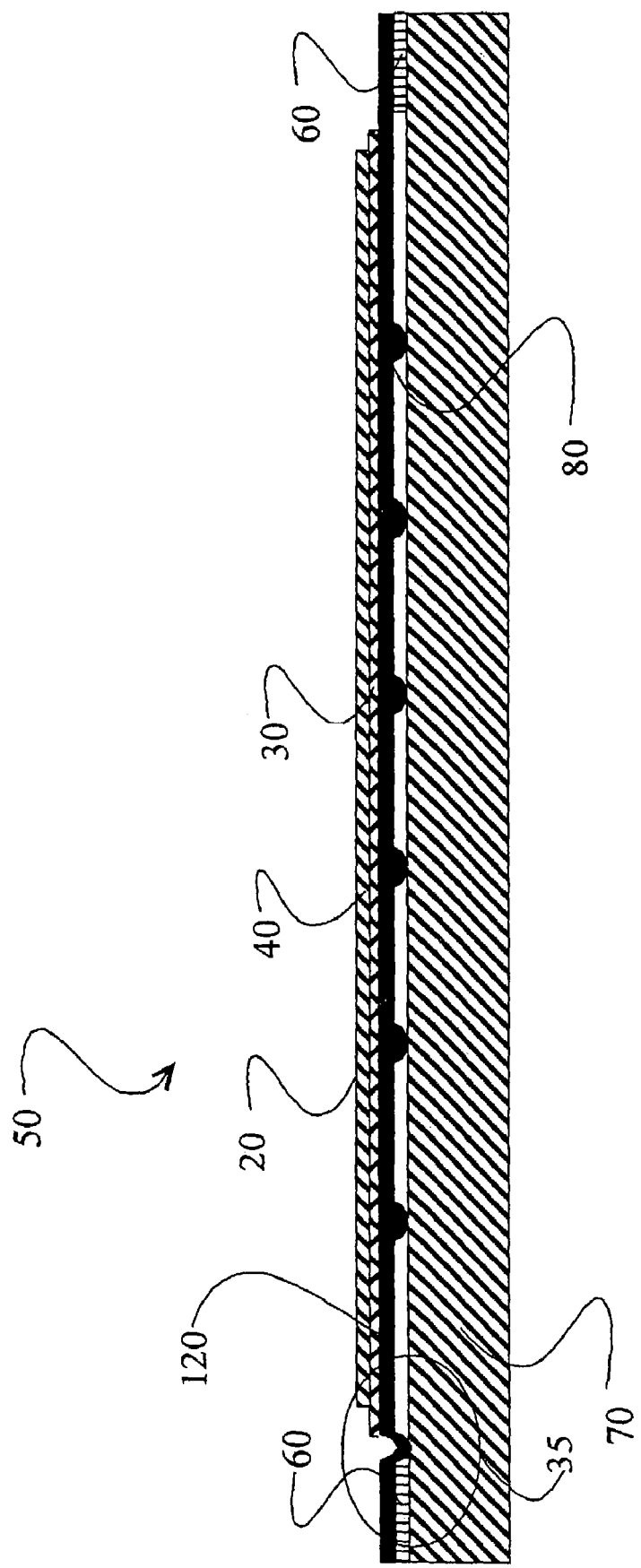
FIG. 2 shows a side elevational cross-sectional view of a one touch screen assembly using the laminate of FIG. 1, in which a false touch is present.

Reference is now made to FIG. 2. Laminate 10 is typically made with lower polyester layer 30 being larger than upper glass layer 20. By creating a larger lower surface the laminate is easier to make.

Optical adhesive 40 also preferably extends beyond the edges of glass layer 20 and is allowed to build up slightly about the edges of glass layer 20. This locks glass layer 20 in place and makes it harder to move or separate from polymer layer 30. The buildup of optical adhesive 40 also prevents microfractures in the glass caused by cutting from propagating into larger fractures.

Experimenting with the laminate, the inventor has found that a problem can arise due to the different thermal expansion rates of lower polyester layer 30, adhesive 40 and upper glass layer 20. Polyester layer 30 and adhesive 40 have similar expansion rates, but glass layer 20 and polyester layer 30 have very different expansion rates, polyester layer 30 having a higher expansion rate than glass layer 20.

When applied to a touch screen display 50 these expansion rates can create false touches or shorts 35 between touch screen laminate 10 and the backing display layer 70. This happens when touch screen display 50 is exposed to different temperature extremes. When it is cold, polyester layer 30 will shrink.

Touch screen membranes are typically mounted to a backing surface 70 using a pressure sensitive adhesive 60 along the periphery of the outer touch screen layer. This adhesive 60 has a bubble-gum like texture and is not elastic.

When polyester layer 30 shrinks when exposed to cold, pressure sensitive adhesive 60 stretches to allow the polyester layer 30 to contract. The touch screen display 50 will still function at this point. However, when touch screen display 50 is warmed up again, polyester layer 30 will expand, and since pressure sensitive adhesive 60 is not elastic, the polyester will tend to rumple between pressure sensitive adhesive 60 and spacer dots 80 used to maintain a normal spacing between the conductive coating applied to the lower surface of layer 30 and the upper surface of backing surface 70, as illustrated by false short 35. While not illustrated, one skilled in the art will realize that spacer dots 80 can be affixed to either polyester layer 30 or backing surface 70.

Glass layer 20 tends to keep the remainder of polyester layer 30 flat, and thus the expansion will be reflected completely or at least primarily along the edge of glass layer 20. In the prior art, the completely polymer touch screen would distribute this expansion evenly. However, due to adhesive 40 and glass layer 20, this does not occur in laminate 10, and the problem of false touches is increased in those cases in which the screens are exposed to temperature extremes.

Figure 3:
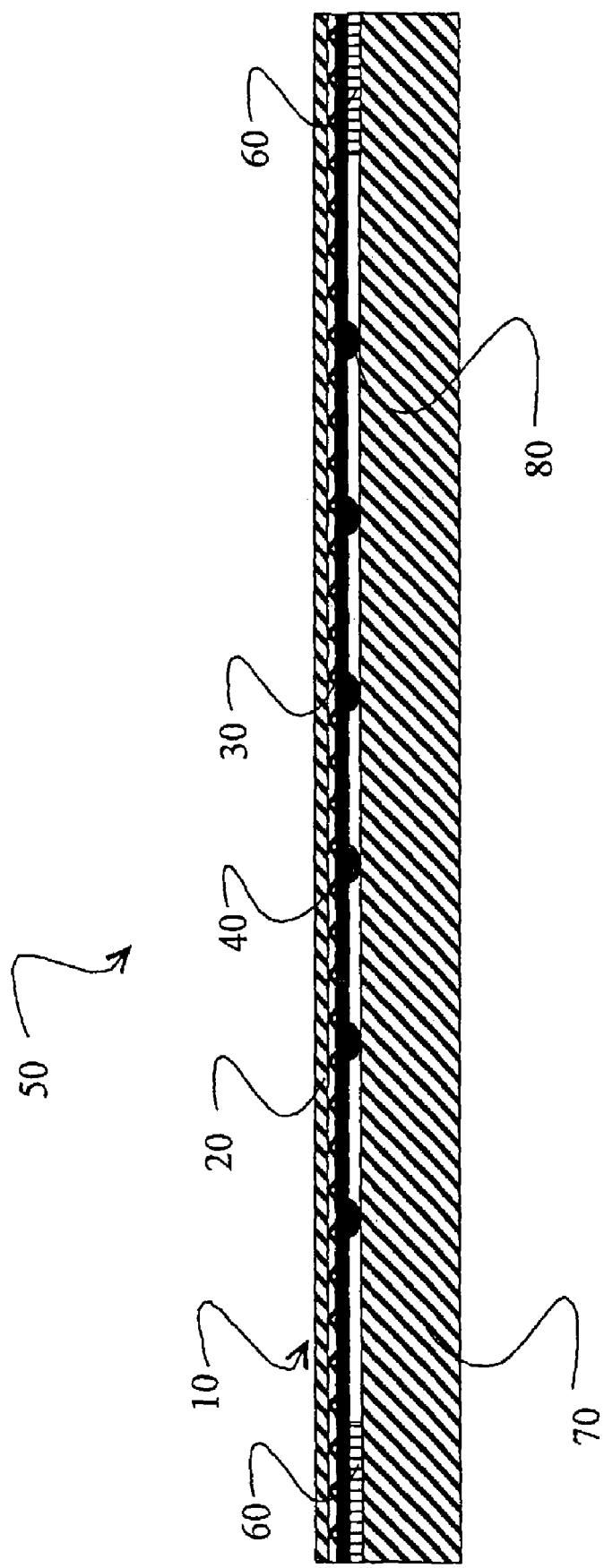
FIG. 3 shows a side elevational cross-sectional view of one solution to the false touch problem of FIG. 2.

Reference is now made to FIG. 3. One possible solution to the above problem is to expand glass layer 20 to the edges of polyester layer 30. This would ensure that polyester layer 30 remains flat against glass layer 20, to limit or prevent false touches.

A possible problem with this solution is that adhesive 40 may fail due to repeated expansion or contraction of polyester layer 30 without the outer expansion area shown in FIG. 2. In the solution of FIG. 3, adhesive layer 40 absorbs all of the stress induced by the differing expansion rates of the glass and polyester. Eventually it is envisioned that optical adhesive 40 could fail and separation of glass layer 20 and polyester layer 30 could occur.

Figure 4:
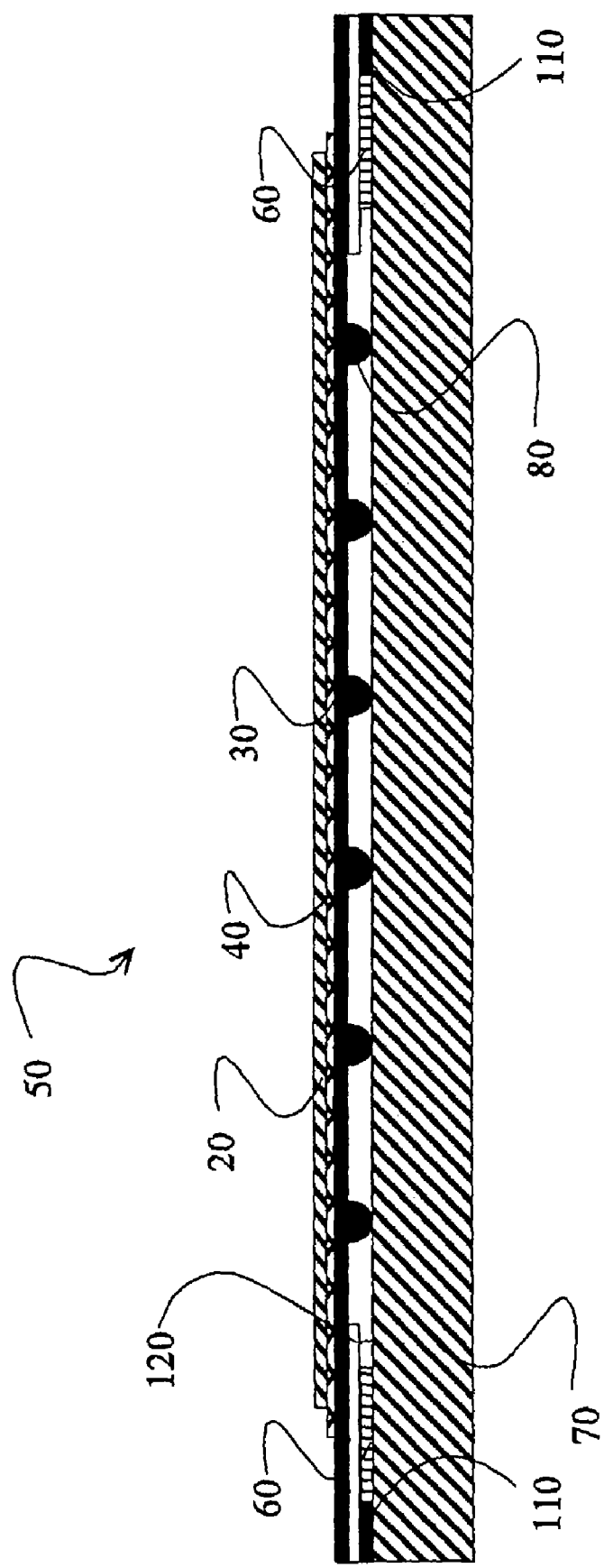
FIG. 4 shows a side elevational cross-sectional view of a preferred embodiment of the touch screen assembly of the present invention which overcomes the false touch problem of FIG. 2.

A preferred solution to the above problem is illustrated in FIG. 4. In this embodiment, polyester layer 30 is larger than glass layer 20, thus still permitting ease of manufacture. It also allows optical adhesive 40 to be built up about the edges of glass layer 20 to better hold glass layer 20 to polyester layer 30.

In order to overcome the false touch problem, an elastic tensioner 110 is added to touch screen display 50 to circumscribe adhesive 60. Further, an active area insulator 120 is added between polyester layer 30 and elastic tensioner 110.

Elastic tensioner 110 preferably comprises silicon rubber. In operation, elastic tensioner 110 creates an elastic force that normally biases or stretches polyester layer 30 outwards. Therefore, if display 50 becomes very cold, polyester layer 50 will shrink, pulling pressure sensitive adhesive 60 inwards, along with elastic tensioner 110. When the display 50 is later warmed, elastic tensioner 110 pulls polyester layer 30 back to its original configuration, reducing the possibility of rumples, and thus false touches.

Area insulator 120 further aids in preventing a false short 35 by providing a non-conductive layer in the area most likely to make false contact. Area insulator 120 comprises an ultraviolet ink film printed onto the lower surface of the polyester layer 30 along its outer edges. As one skilled in the art will appreciate, the thickness of area insulator 120 in FIG. 4 has been exaggerated for illustrative purposed, and in practice area insulator 120 adds no significant spacing between polyester layer 30 and backing surface 70.

Area insulator 120 reduces the chances of electrical contact between polyester layer 30 and backing surface 70. It has been found that pressure sensitive adhesive 60 is insufficient for this purpose.

Area insulator 120 bonds aggressively, perhaps covalently, to polyester layer 30, and thus pressure sensitive adhesive 60 and elastic tensioner 110 are essentially bonded to polyester layer 30 itself.

One skilled in the art will realize that the embodiments illustrated in FIGS. 2 and 3 will typically also have an area insulator layer 120 between polyester layer 30 and pressure sensitive adhesive 60.

When combined, the above configuration provides a resistive touch screen with an outer glass layer, overcoming the difficulties of the prior art. The above configuration further provides a means to compensate for the different thermal expansion rates of the different materials of the laminate.

Although the present invention has been described in detail with regard to the preferred embodiment thereof, one skilled in the art will easily realize that other versions are possible, and that the invention is only intended to be limited in scope by the following claims.

The invention claimed is:

1. A flexible membrane for a resistive touch screen display, said flexible membrane comprising:
    a glass laminate, wherein said glass laminate consists of:
    an ultra-thin glass layer having upper and lower surfaces and a peripheral edge therebetween;
    a polymer layer having upper and lower surfaces and a peripheral edge therebetween; and
    an adhesive between said glass layer and said polymer layer for bonding the two layers together, said glass layer being smaller than said polymer layer wherein said peripheral edge of said glass layer lies within said peripheral edge of said polymer layer;
    said flexible membrane further comprising an area insulator layer applied in a peripheral band to said lower surface of said polymer layer
    said area insulator layer comprising an ultraviolet ink film.

2. The membrane of claim 1, wherein said adhesive seals around said peripheral edge of said glass layer.

3. The membrane of claim 1, wherein said glass layer is approximately 0.5 mm thick.

4. The membrane of claim 1, wherein said polymer layer comprises a polyester film approximately 0.175 mm thick.

5. The membrane of claim 1, wherein said adhesive is an optical adhesive formed in a uniform thickness in the range of approximately 0.025 to 0.05 mm in the area between said glass layer and said polymer layer.

6. In a touch screen having a flexible outer membrane with a first conductive surface, a backing surface with a second conductive surface, and sensors to detect contact between the first conductive surface and the second conductive surface, the improvement comprising the flexible outer membrane, wherein the flexible outer membrane consists of;
    an ultra-thin glass layer having upper and lower surfaces and a peripheral edge therebetween;
    a polymer layer having upper and lower surfaces and a peripheral edge therebetween;
    an adhesive between said glass layer and said polymer layer for bonding the two layers together, said glass layer being smaller than said polymer layer wherein said peripheral edge of said glass layer lies within said peripheral edge of said polymer layer; and
    an area insulator layer applied in a peripheral band to said lower surface of said polymer layer;
    said area insulator layer comprising an ultraviolet ink film.

7. The touch screen of claim 6 wherein said optical adhesive is allowed to build up around said peripheral edge of said glass layer.

8. The touch screen of claim 6, wherein said glass layer is approximately 0.5 mm thick.

9. The touch screen of claim 6, wherein said polymer layer comprises polyester film approximately 0.175 mm thick.

10. The touch screen of claim 6, wherein said adhesive is an optical adhesive formed in a uniform thickness in the range of approximately 0.025 to 0.05 mm in the area between said glass layer and said polymer layer.

11. A resistive touch screen display, said display comprising:
    a backing surface;
    a pressure sensitive adhesive affixed between the periphery of a polymer layer and said backing surface;
    an elastic tensioner affixed between the periphery of said polymer layer and said backing surface, said elastic tensioner being adjacent to said pressure sensitive adhesive;
    a first conductive layer applied to said lower surface of said polymer layer;
    a second conductive layer applied to said backing surface;
    sensors used to detect where said first conductive layer contacts said second conductive layer; and
    a flexible membrane, wherein said flexible membrane consists of:
    an ultra-thin glass layer having upper and lower surfaces and a peripheral edge therebetween;
    said polymer layer, said polymer layer having upper and lower surfaces and a peripheral edge therebetween, said glass layer being smaller than said polymer layer wherein the peripheral edge of said glass layer lies within the peripheral edge of said polymer layer;
    an adhesive between said glass layer and said polymer layer for bonding the two layers together; and
    an area insulator layer between said polymer layer and said pressure sensitive adhesive, said area insulator comprising an ultraviolet ink film.

12. The touch screen of claim 11, wherein said glass layer is approximately 0.5 mm thick.

13. The touch screen of claim 11, wherein said polymer layer is a polyester film.

14. The touch screen of claim 13, wherein said polyester film is approximately 0.175 mm thick.

15. The touch screen of claim 11, wherein said adhesive is an optical adhesive formed in a uniform thickness in the range of 0.025 to 0.05 mm in the area between said glass layer and said polymer layer.

16. The touch screen of claim 11, wherein said adhesive forms a bead about the peripheral edge of said glass layer.

17. The touch screen of claim 11, wherein said elastic tensioner comprises a silicon rubber.

18. A flexible membrane for a resistive touch screen display, said flexible membrane comprising:
    a glass laminate, wherein said glass laminate consists of:
    an ultra-thin glass layer; a polymer layer having upper and lower surfaces;
    an optical adhesive between said ultra-thin glass layer and said upper surface of said polymer layer, said optical adhesive holding said ultra-thin glass layer to said polymer layer; and
    an insulating film of ultraviolet ink applied in a peripheral band to said lower surface of said polymer layer.

19. The membrane of claim 18, said polymer layer being larger than said glass layer to extend beyond the periphery of said glass layer.

20. The membrane of claim 19, wherein said optical adhesive is allowed to build-up about said periphery of said glass layer.

21. The membrane of claim 18, wherein said glass layer is approximately 0.5 mm thick.

22. The membrane of claim 21, wherein said polymer layer is a polyester film approximately 0.175 mm thick.

23. The membrane of claim 22, wherein said optical adhesive is formed in a uniform thickness in the range of 0.025 and 0.05 mm between said glass layer and said polymer layer.

24. In a touch screen having a flexible outer membrane with a first conductive surface, a backing surface with a second conductive surface, and sensors to detect contact between the first conductive surface and the second conductive surface, the improvement comprising:

the flexible outer membrane, wherein said flexible outer membrane consists of:
an ultra-thin glass layer;
a polymer layer having upper and lower surfaces;
an optical adhesive between said ultra-thin glass layer and said upper surface of said polymer layer, said optical adhesive holding said ultra-thin glass layer to said polymer layer; and
an insulating film of ultraviolet ink applied in a peripheral band to said lower surface of said polymer layer.

25. The touch screen of claim 24, said polymer layer being larger than said glass layer to extend beyond the periphery of said glass layer.

26. The touch screen of claim 25, wherein said optical adhesive is allowed to build-up about said periphery of said glass layer.

27. The touch screen of claim 24, wherein said glass layer is approximately 0.5 mm thick.

28. The touch screen of claim 27, wherein said polymer layer is a polyester film approximately 0.175 mm thick.

29. The touch screen of claim 28, wherein said optical adhesive is formed in a uniform thickness in the range of 0.025 and 0.05 mm between said glass layer and said polymer layer.

30. A resistive touch screen display, said display comprising:

a backing surface;
a pressure sensitive adhesive affixed between the periphery of a polymer layer and said backing surface;
an elastic tensioner affixed between the periphery of said polymer layer and said backing surface, said elastic tensioner being adjacent to said pressure sensitive adhesive;
a first conductive layer applied to said lower surface of said polymer layer;
a second conductive layer applied to said backing surface;
sensors used to detect where said first conductive layer contacts said second conductive layer; and
a flexible membrane, wherein said flexible membrane consists of:
an ultra-thin glass layer;
said polymer layer, said polymer layer being larger than said glass layer to extend beyond the peripheral edges of said glass layer by a predetermined distance in each direction;
an optical adhesive between said ultra-thin class layer and said polymer layer, said optical adhesive holding said ultra-thin glass layer to said polymer layer; and
an area insulator layer between said polymer layer and said pressure sensitive adhesive, said area insulator comprising an ultraviolet ink film.

31. The touch screen of claim 30, wherein said optical adhesive is allowed to build-up against said peripheral edges of said glass layer.

32. The touch screen of claim 30, wherein said glass layer is approximately 0.5 mm thick.

33. The touch screen of claim 32, wherein said polymer layer is a polyester film approximately 0.175 mm thick.

34. The touch screen of claim 33, wherein said optical adhesive is formed in a uniform thickness in the range of 0.025 and 0.05 mm between said glass layer and said polymer layer.

35. The touch screen of claim 30, wherein said ultraviolet ink film is applied in a band to extend inwardly, by predetermined amount, onto said lower surface of said polymer layer relative to said pressure sensitive adhesive to provide a zone of insulation between said lower surface of said polymer layer and said backing surface inwardly adjacent of said pressure sensitive adhesive.

* * * * *